United States Patent
Ashrafzadeh et al.

(10) Patent No.: US 8,156,748 B2
(45) Date of Patent: Apr. 17, 2012

(54) ICE QUALITY SENSING SYSTEM EMPLOYING DIGITAL IMAGING

(75) Inventors: Farhad Ashrafzadeh, Stevensville, MI (US); Kevin M. Chase, Saint Joseph, MI (US); Brian P. Janke, Ann Arbor, MI (US); Shreecharan Kanchanavally, Lisle, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 414 days.

(21) Appl. No.: 12/550,893

(22) Filed: Aug. 31, 2009

(65) Prior Publication Data

US 2010/0046793 A1    Feb. 25, 2010

Related U.S. Application Data

(63) Continuation-in-part of application No. 11/741,344, filed on Apr. 27, 2007.

(51) Int. Cl.
  *F25C 1/00* (2006.01)
  *F25C 5/18* (2006.01)
(52) U.S. Cl. ............. 62/137; 62/135; 62/136; 62/344
(58) Field of Classification Search ............ 62/135–137, 62/344, 125–126; 222/146.6
See application file for complete search history.

(56) References Cited

U.S. PATENT DOCUMENTS

| | | |
|---|---|---|
| 4,822,996 A | 4/1989 | Lind |
| 4,938,030 A | 7/1990 | Josten et al. |
| 5,501,367 A | 3/1996 | Chigira |
| 5,901,561 A | 5/1999 | Allison et al. |
| 6,050,097 A | 4/2000 | Nelson et al. |
| 6,082,130 A | 7/2000 | Pastryk et al. |
| 6,314,745 B1 | 11/2001 | Janke et al. |
| 6,351,958 B1 | 3/2002 | Pastryk et al. |
| 6,414,301 B1 | 7/2002 | Borg, Jr. et al. |
| 6,511,694 B2 | 1/2003 | Huang et al. |
| 6,561,691 B1 | 5/2003 | McCann et al. |
| 6,581,392 B1 | 6/2003 | Gist et al. |
| 6,848,264 B2 * | 2/2005 | Lee et al. ................... 62/178 |
| 6,919,795 B2 * | 7/2005 | Roseen ............... 340/309.16 |
| 2002/0066279 A1 * | 6/2002 | Kiyomatsu ................... 62/125 |
| 2006/0096303 A1 * | 5/2006 | Kavounas ................... 62/125 |

FOREIGN PATENT DOCUMENTS

JP    2002-295959 A    10/2002

* cited by examiner

*Primary Examiner* — Frantz Jules
*Assistant Examiner* — Cassey D Bauer
(74) *Attorney, Agent, or Firm* — Kirk W. Goodwin; Diederiks & Whitelaw PLC

(57) ABSTRACT

A refrigerator includes a sensing system for detecting quality of ice cubes in an ice cube storage bin. The system includes a digital image capture device coupled to a digital image analyzing system which captures digital images of the ice cube storage bin intermittently. The digital images are processed to determine a centroid of the ice mass within the bin, and the centroid is analyzed to determine whether it is located outside a predetermined acceptable boundary. A centroid outside of the acceptable range indicates an ice clumping situation. Additionally, the digital images are analyzed to determine whether ice cubes are smaller than a predetermined minimal acceptable size in order to detect stale ice. The level of ice in the bin can also be determined from the images. Notifications for clumping, stale and/or low level ice are sent to a user interface.

19 Claims, 10 Drawing Sheets

ICE QUALITY SENSING SYSTEM EMPLOYING DIGITAL IMAGING

CROSS-REFERENCE TO RELATED APPLICATIONS

The present invention represents a continuation-in-part of U.S. patent application Ser. No. 11/741,344, filed Apr. 27, 2007, pending.

BACKGROUND OF THE INVENTION

1. Field of the Invention

The present invention pertains to the art of refrigerators and, more particularly, to a sensing system that employs digital imaging technology to determine a level and/or quality of ice cubes in an ice cube storage bin.

2. Description of the Related Art

Sensing a level of ice cubes in an ice cube storage bin is well known in the art. That is, refrigerators that employ automatic ice makers have, for years, employed a mechanism of one form or another to detect a level of ice in an ice cube storage bin. Basically, when the level of ice reaches a predetermined point, the ice maker is deactivated to prevent overflow. Most level sensing arrangements employ a bale arm that is pivotally mounted to the ice maker. The bale arm extends into the ice cube storage bin and is acted upon by ice cubes contained therein. More specifically, as the level of ice cubes in the ice cube storage bin rises, the bale is urged upward. When the level of ice cubes reaches a predetermined point, the bale arm acts upon a switch to temporarily shut off the ice maker, thereby halting ice production. When the level of ice cubes falls below the predetermined point, the bale arm moves downward, the ice maker is activated and a new ice production cycle is initiated.

Over time, manufacturers developed more advanced systems for detecting a level of ice in an ice cube storage bin. The more advanced systems were particularly developed for door mounted ice cube storage bins where the use of bale arms is inappropriate or impractical. These more advanced systems employ various types of electronic sensors, such as infrared, ultrasonic, capacitive and even weight sensors in order to determine the level of ice in the ice cube storage bin and control operation of the ice maker.

In addition to the challenges associated with sensing ice levels, there exists the problem of determining ice quality. Over time, ice in a freezer bin can become stale and develop an undesirable taste. Additionally, when ice is exposed to warm air over time, as when a freezer door is repeatedly opened and closed, individual ice cubes may melt fractionally causing shrinking of the ice. Furthermore, individual ice cubes may refreeze to other cubes, forming clumps of ice which are not easily utilized or discharged from an automatic ice dispenser.

Regardless of the existence of various known ice level sensing devices, there is still a need for further advancements in ice level sensing. More specifically, there exists a need for a more versatile ice sensing system that employs digital imaging technology and which is capable of effectively sensing a quality of the ice cubes in an ice cube storage bin.

SUMMARY OF THE INVENTION

The present invention is directed to a refrigerator including a cabinet having top, bottom, rear and opposing side walls that collectively define a refrigerator body having a refrigeration, e.g., freezer, compartment. The refrigerator further includes a door mounted to the cabinet for selectively providing access to the refrigeration compartment. The refrigeration compartment is provided with an ice maker, with the formed ice being stored in an ice cube storage bin. In accordance with the invention, the refrigerator employs an ice cube sensing system that utilizes digital images to determine a property, particularly quality, of ice cubes in the ice cube storage bin.

More specifically, the ice cube sensing system employs a digital image capture device which is focused upon the ice bin. The digital image capture device is coupled to a digital image analyzing system that scans digital images of the ice cube storage bin to determine the presence of ice clumps or stale ice within the ice bin. Specifically, digital images of ice cubes within the ice bin are processed to determine a centroid or center of the ice cube mass. If the centroid is determined to be outside acceptable boundaries, then an ice clump event is detected and an alert sent to a user interface.

In further accordance with the invention, the system also determines the size of ice cubes within the ice bin and compares them to a minimum desired ice cube size. If the size of the ice cubes is below the minimum desired ice cube size, then a stale ice event is detected and an alert sent to a user interface.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
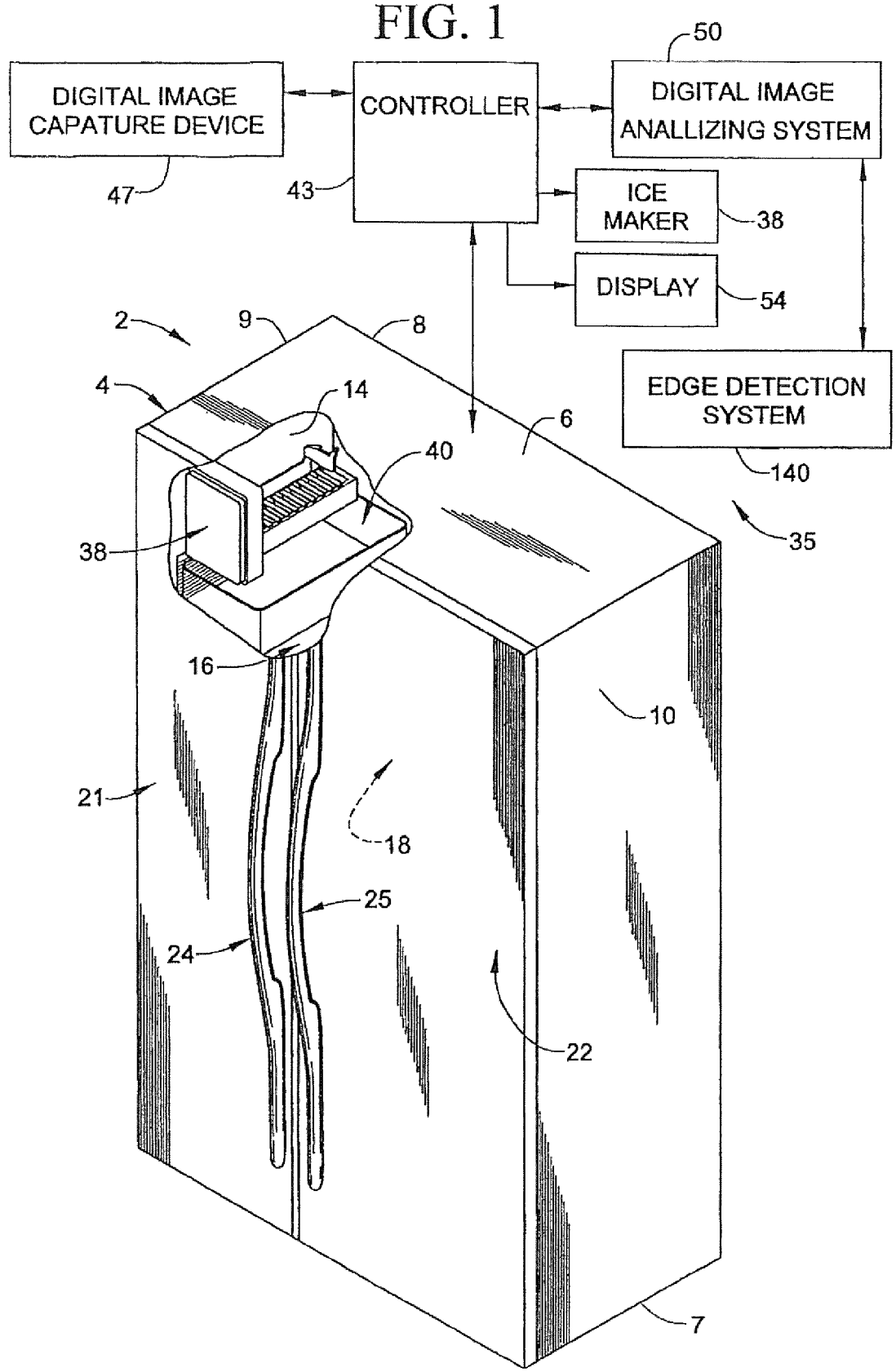
FIG. 1 is an upper left perspective view of a refrigerator incorporating an ice level and quality sensing system constructed in accordance with the present invention.

As best shown in FIG. 1, a refrigerator constructed in accordance with a first embodiment of the present invention is generally indicated as 2. Refrigerator 2 includes a cabinet 4 having a top wall 6, a bottom wall 7, a rear wall 8, and opposing sidewalls 9 and 10 that collectively define a refrigerator body. Refrigerator 2 is further shown to include a liner 14 that defines a refrigeration compartment, such as a freezer compartment 16. A fresh food compartment 18 is arranged alongside freezer compartment 16 such that refrigerator 2 defines a side-by-side model. Of course, it should be understood that the present invention can be readily incorporated into various refrigerator models, including top mount, bottom mount and French-style door model refrigerators. At this point, it should also be understood that the referenced freezer compartment 16 could be constituted by a dedicated ice producing section provided in the fresh food compartment. In any case, in the exemplary embodiment shown, refrigerator 2 includes a freezer compartment door 21 and a fresh food compartment door 22 pivotally mounted to cabinet 4 for selectively providing access to freezer compartment 16 and fresh food compartment 18 respectively. In a manner also known in the art, each compartment door 21, 22 includes a corresponding handle 24, 25.

In accordance with the invention, refrigerator 2 is provided with an ice making system 35 including an automatic ice maker 38 positioned above a transparent ice cube storage bin 40. As will be discussed more fully below, ice making system 35 automatically detects a level and quality of ice cubes contained within ice cube storage bin 40. Towards that end, ice making system 35 includes a controller 43 which receives input from a digital image capture device 47. Digital images from digital image capture device 47 are passed to a digital image analyzing system 50 which preferably determines both the level and quality of ice cubes within ice cube storage bin 40. Level data is passed to controller 43 to establish ice production cycles for ice maker 38. More specifically, if digital image analyzing system 50 determines that a level of ice cubes in ice cube storage bin 40 is below a predetermined level, controller 43 will signal ice maker 38 to continue ice production. However, in the event that digital image analyzing system 50 determines that the level of ice cubes in ice cube storage bin 40 is at or above the predetermined level, controller 43 signals ice maker 38 to cease ice production. Also, if digital image analyzing system 50 determines that the quality of ice cubes within ice cube storage bin 40 is below a predetermined level, a signal is presented on a display 54, such as an LCD display, indicating that the ice cubes should be replaced.

Figure 2:
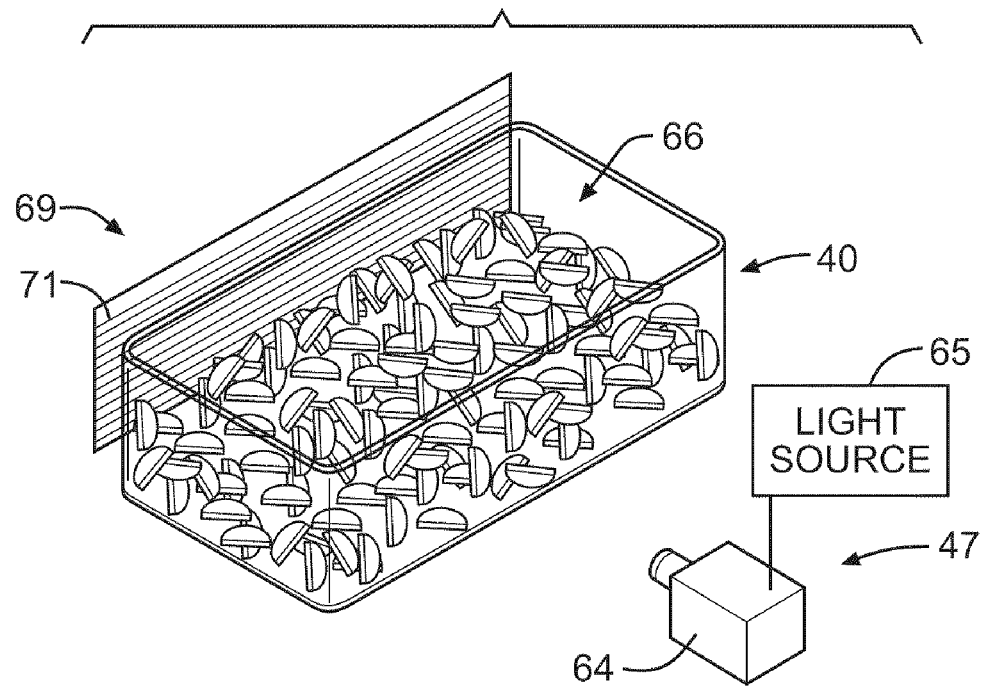
FIG. 2 is an upper right perspective view of a digital image capture portion of the ice level and quality sensing system of the present invention.
Figure 3:
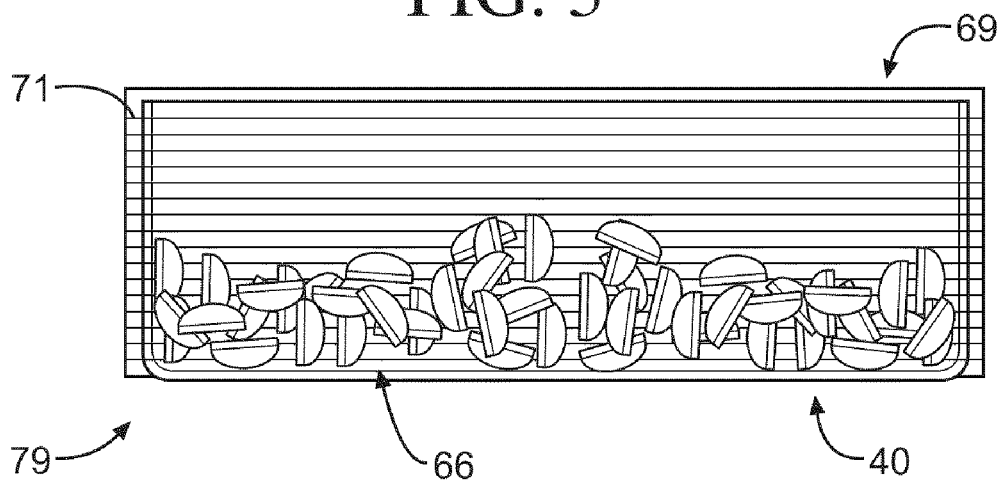
FIG. 3 is a side elevational view of an ice bin illustrating ice cubes contrasted against a referenced image.
Figure 4:
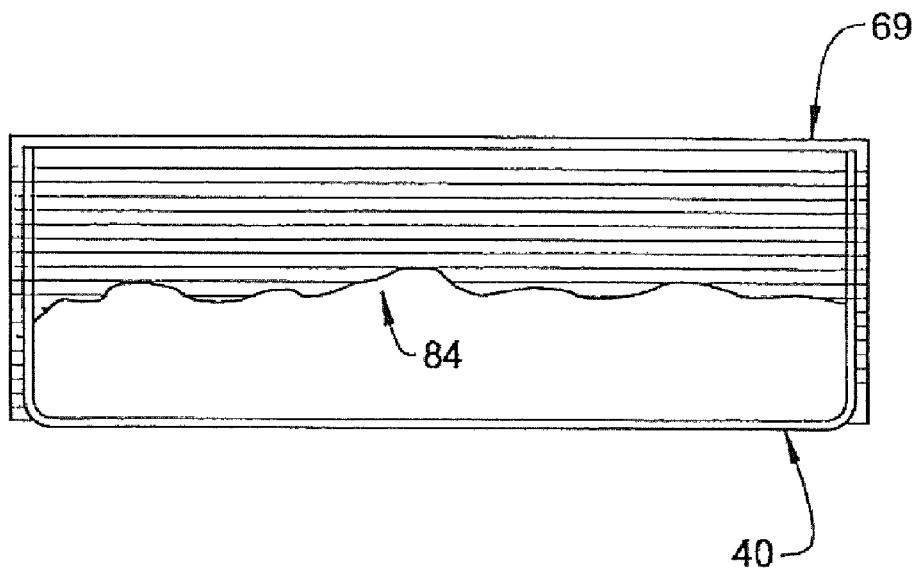
FIG. 4 is a side elevational view illustrating a level indication captured by the digital image capture device of FIG. 2.
Figure 5:
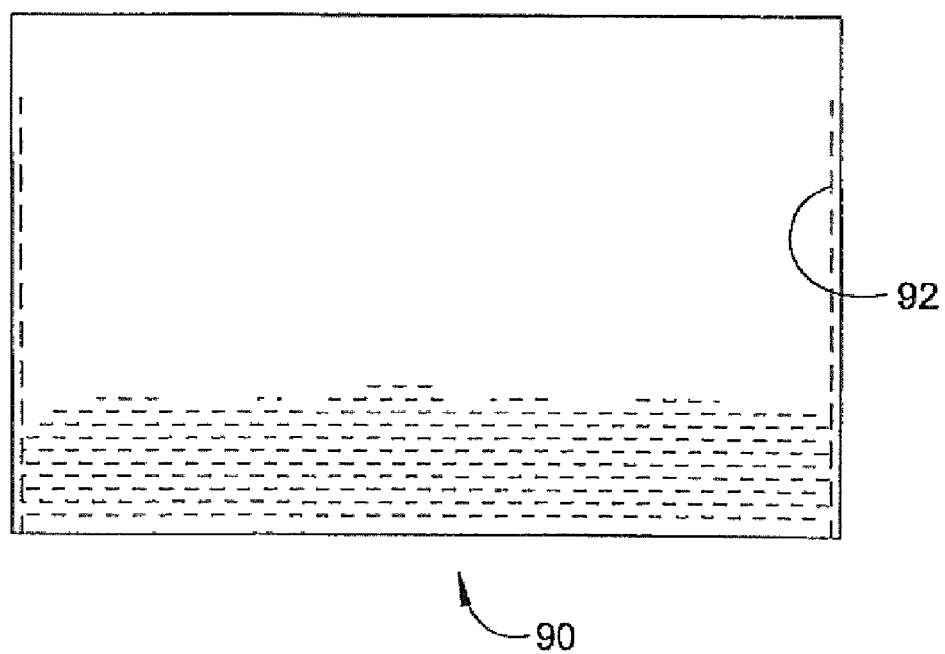
FIG. 5 is a mathematical representation of a level of ice contained within an ice cube storage bin.

As best shown in FIG. 2, digital image capture device 47 takes the form of a digital camera 64. Digital camera 64 can take on a variety of forms, such as a charged/coupled device (CCD) camera or complimentary metal oxide semiconductor (CMOS) camera. Digital camera 64 is preferably operatively connected to a light source 65 which produces light of one or more wavelengths. That is, light source 65 can bathe ice cube storage bin 40 in white light, colored light or non-visible light depending upon a particular parameter of interest. In any case, digital camera 64 is operated to capture digital images of ice cubes 66 stored within ice cube storage bin 40. In a first embodiment depicted in FIGS. 2-4, ice cubes 66 are contrasted against a reference image 69 for clarity. More specifically, in order to provide an appropriate background, ice bin 40 is arranged between reference image 69 and digital camera 64. In the embodiment shown, reference image 69 includes multiple distinct regions 71 which repeat within reference image 69. However, reference image 69 could also be a solid image or simply any desired image chosen to provide contrast for ice cubes 66. In the depicted embodiment, digital camera 64 is positioned to capture a side view 79 of ice cube storage bin 40, such as shown in FIG. 3, to develop an image profile 84 of ice cubes 66 such as shown in FIG. 4. As will be discussed more fully below, image profile 84 is passed to digital image analyzing system 50. Analyzing system 50 creates a mathematical representation 90 of image profile 84 for evaluation purposes as illustrated in FIG. 5. Mathematical representation 90 includes a level indicator or metric 92 which enables analyzing system 50 to determine an actual level of ice cubes 66 in ice cube storage bin 40.

Figure 6:
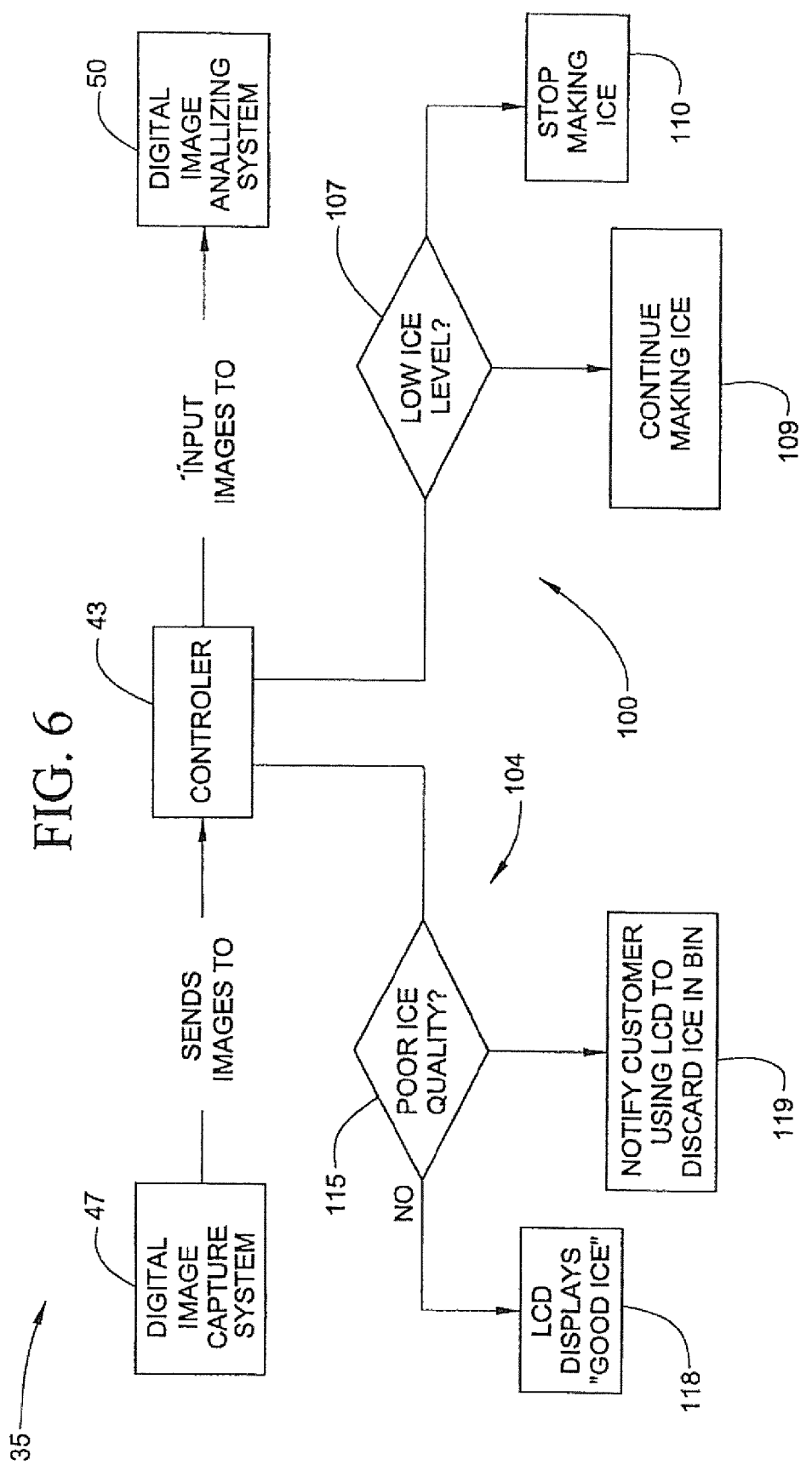
FIG. 6 is a flow chart illustrating an ice level and quality sensing algorithm employed in the present invention.

Reference will now be made to FIG. 6 in describing the operation of ice making system 35 of the present invention. As shown, ice making system 35 includes a first or level analysis portion 100 and a second or quality analysis portion 104. As will be detailed more fully below, level analysis portion 100 determines the particular level of ice cubes 66 within ice cube storage bin 40. More specifically, digital image capture device 47 periodically captures and sends digital images, such as shown in FIG. 4, to controller 43. Controller 43 passes the digital images to digital image analyzing system 50 which produces mathematical representation 90. At this point, analyzing system 50 determines an ice level in ice cube storage bin 40. The result is passed back to controller 43 for review in step 107. If the level of ice is below a predetermined level, controller 43 signals ice maker 38 to continue making ice in block 109. If, however, the level of ice is at or above the predetermined, desired level, controller 43 signals ice maker 38 to cease ice production at 110.

As noted above, in addition to determining a level of ice within ice bin 40, ice making system 35 is also capable of determining a quality of the ice within ice cube storage bin 40. As will be detailed more fully below, if controller 43 determines the quality of ice within ice cube storage bin 40 at 115. If the quality of ice is acceptable, display 54 will indicate that the ice is fresh at 115. If the quality is poor, a signal is passed to display 54 indicating that ice cubes 66 should be discarded at 119. After the ice is discarded, ice maker 38 will produce fresh ice which is deposited into ice storage bin 40.

Figure 7:
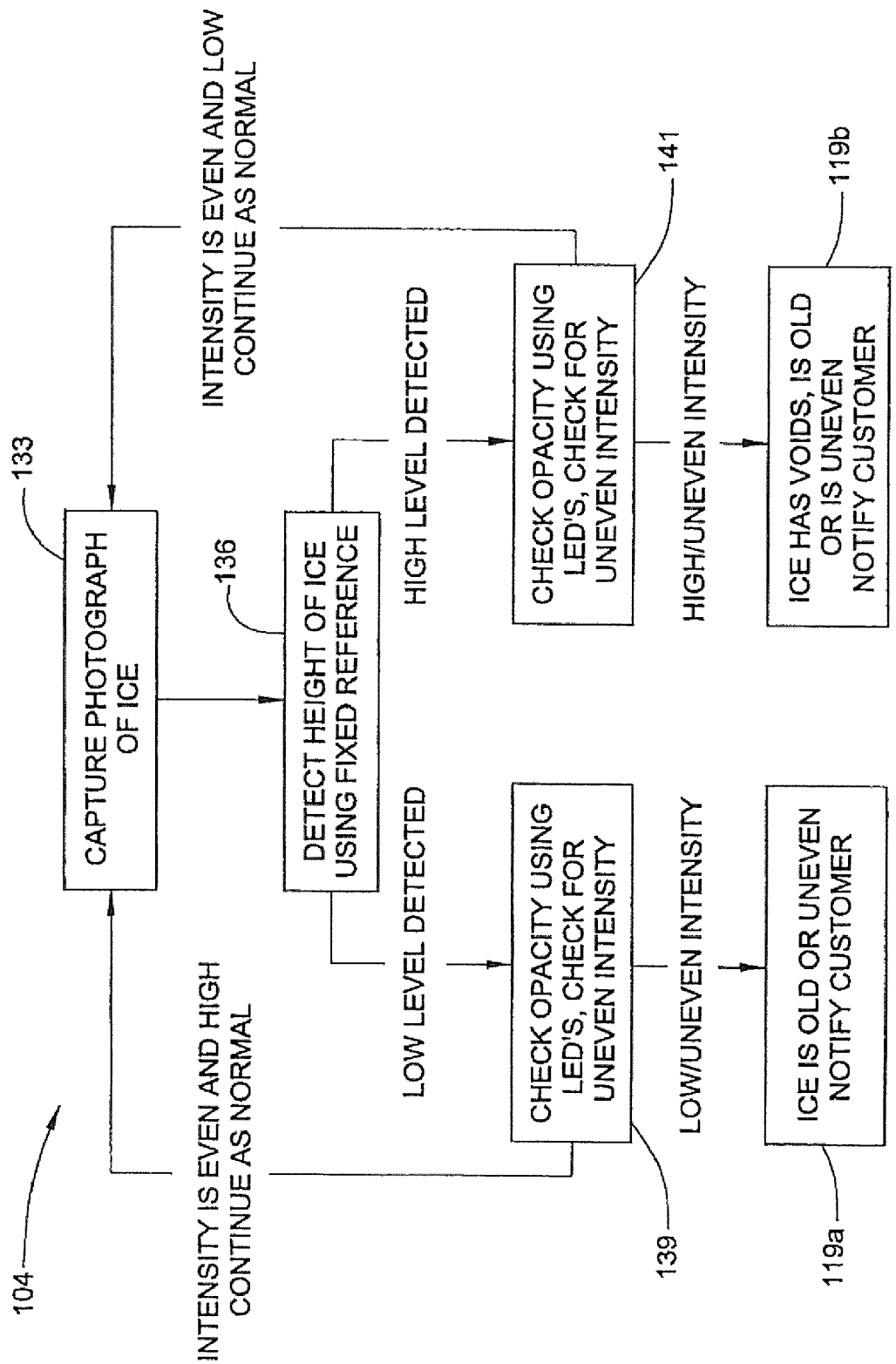
FIG. 7 is a flow chart presenting the details of the quality sensing portion of the ice level and quality sensing system of FIG. 6.

Reference will now be made to FIG. 7 in describing the particulars of quality analysis portion 104 of ice maker system 35. As shown, digital image capture device 47 first captures a photograph or digital image of ice within ice cube storage bin 40 in step 133. The digital image is analyzed by digital image analyzing system 50 to determine a level of ice cubes within ice cube storage bin 40 in step 136. If the level of ice cubes is low, digital camera 64 activates light source 65 which bathes ice cubes 66 in light and a new digital image is captured in step 139. The new digital image is passed back to digital image analyzing system 50 for analysis. Analyzing system 50 includes an edge detection portion 140. Edge detection portion 140 employs an edge detection algorithm to determine if edge portions of ice cubes 66 are sharp (indicating that the ice is fresh) or rounded (indicating that the ice cubes are older). Digital image analyzing system 50 also evaluates the intensity of ice cubes 66 obtained in the new digital image. If the level of ice cubes 66 is low and the intensity of the ice cubes is uneven, a determination is made that the ice cubes are old and should be discarded. As noted above, a signal is passed to display 54 in step 119*a* to notify the user that the ice cubes 66 are no longer fresh. Correspondingly, if the level of ice cubes 66 in ice cube storage bin is at or above the predetermined level, digital camera 64 activates light source 65 and captures an image of the ice cubes within ice cube storage bin 40 in step 141 using, for example, non-visible light. The image captured in step 141 is passed back to digital image analyzing system 50 for analysis. After evaluating edge portions of ice cubes 66, analyzing system 50 evaluates the intensity of the digital image. If analyzing system 50 determines that the level of ice cubes in ice cube storage bin is high and the image captured in step 141 is uneven, a determination is made that the ice cubes contain voids, are old (e.g., soft with rounded edges) or uneven and should be replaced. This determination is signaled on display 54 in step 119b.

Figure 8:
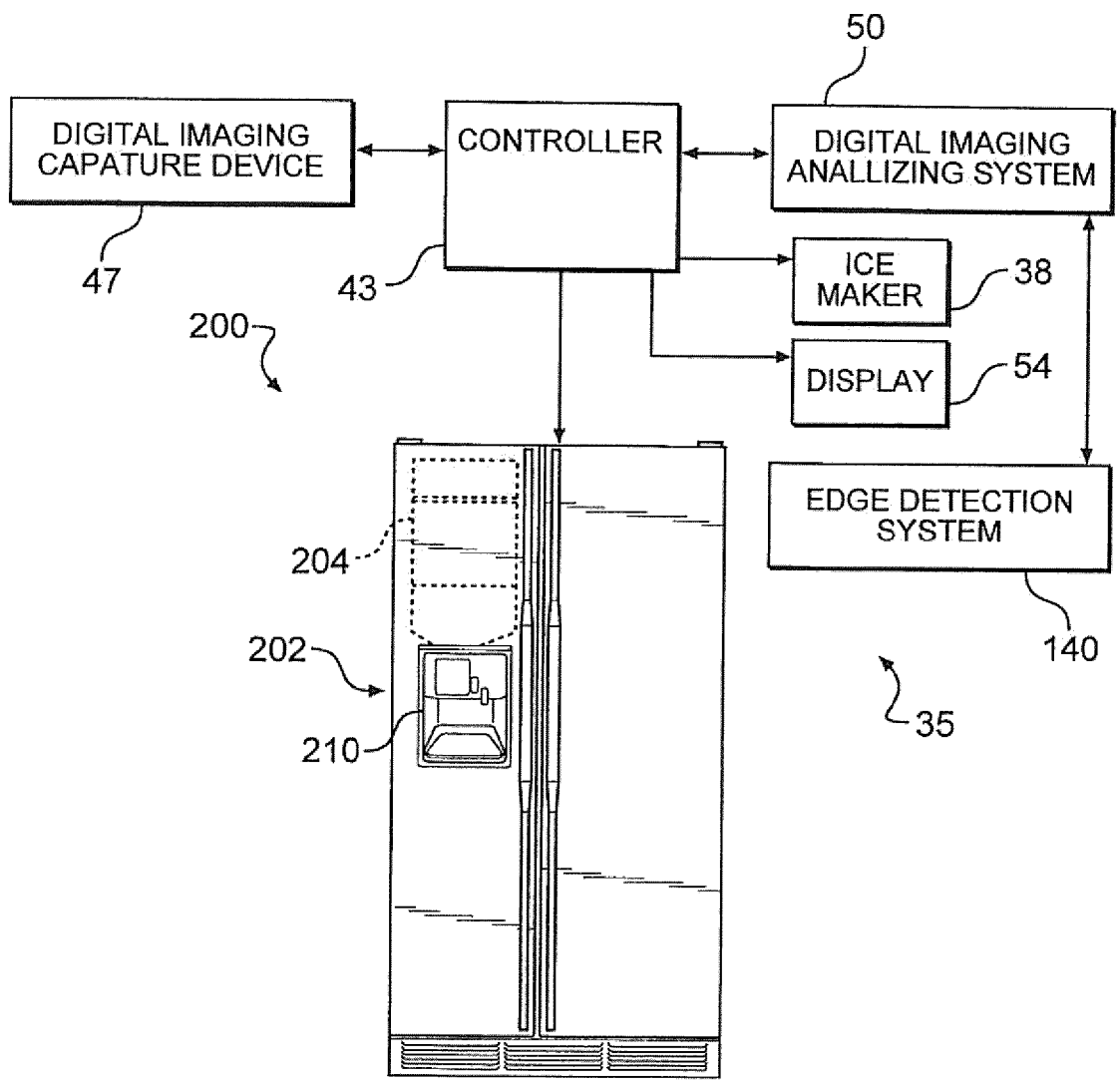
FIG. 8 is a front view of a refrigerator having a door mounted dispensing system and incorporating an ice level and quality sensing system of the present invention.
Figure 9A:
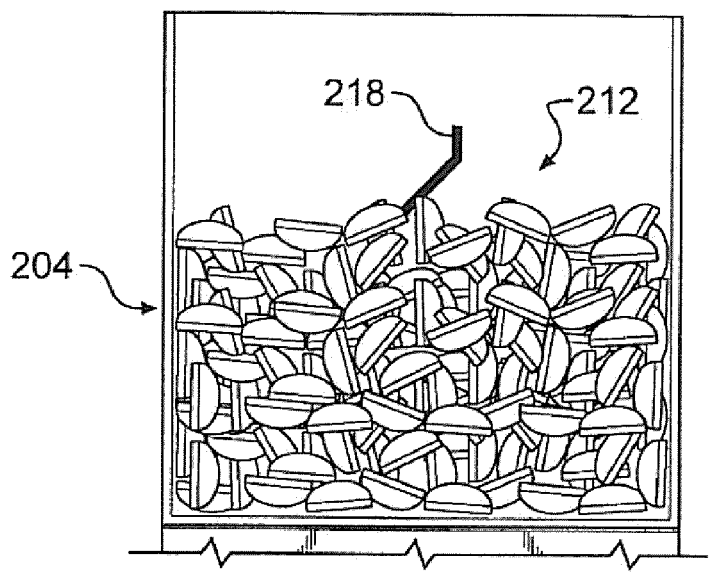
FIGS. 9A-9C illustrate the degradation in quality of ice over time and the formation of ice clumps in the door-mounted ice cube storage bin.
Figure 9B:
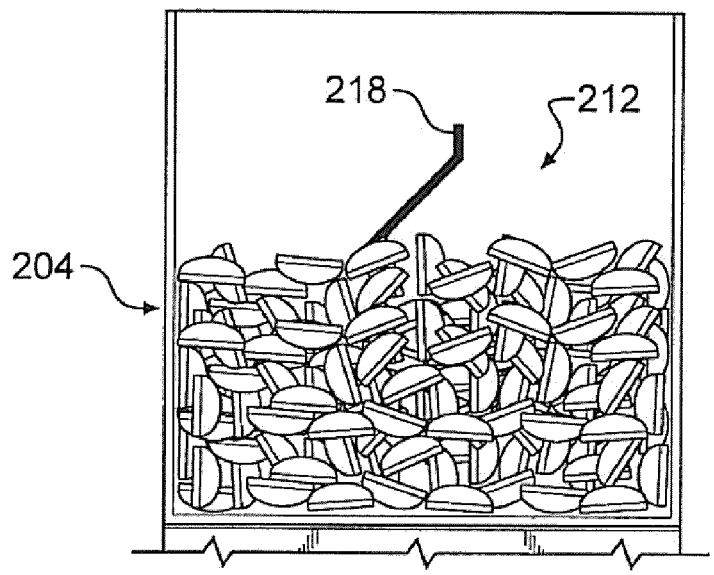
Figure 9C:
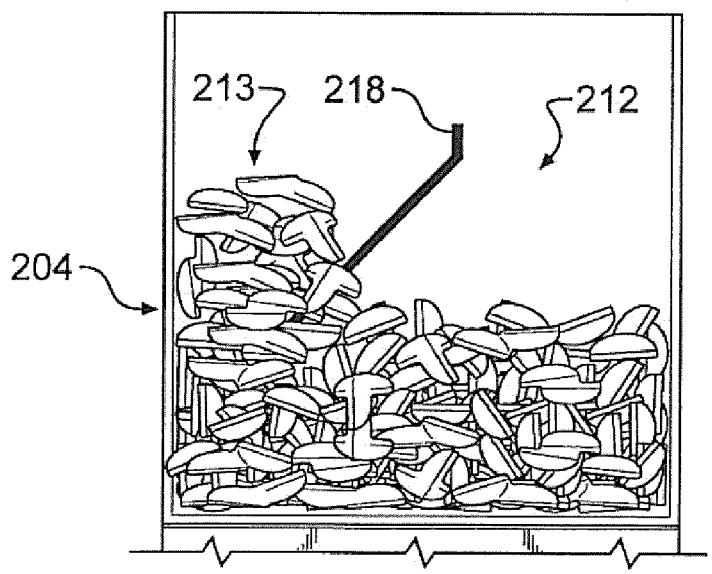
Figure 10:
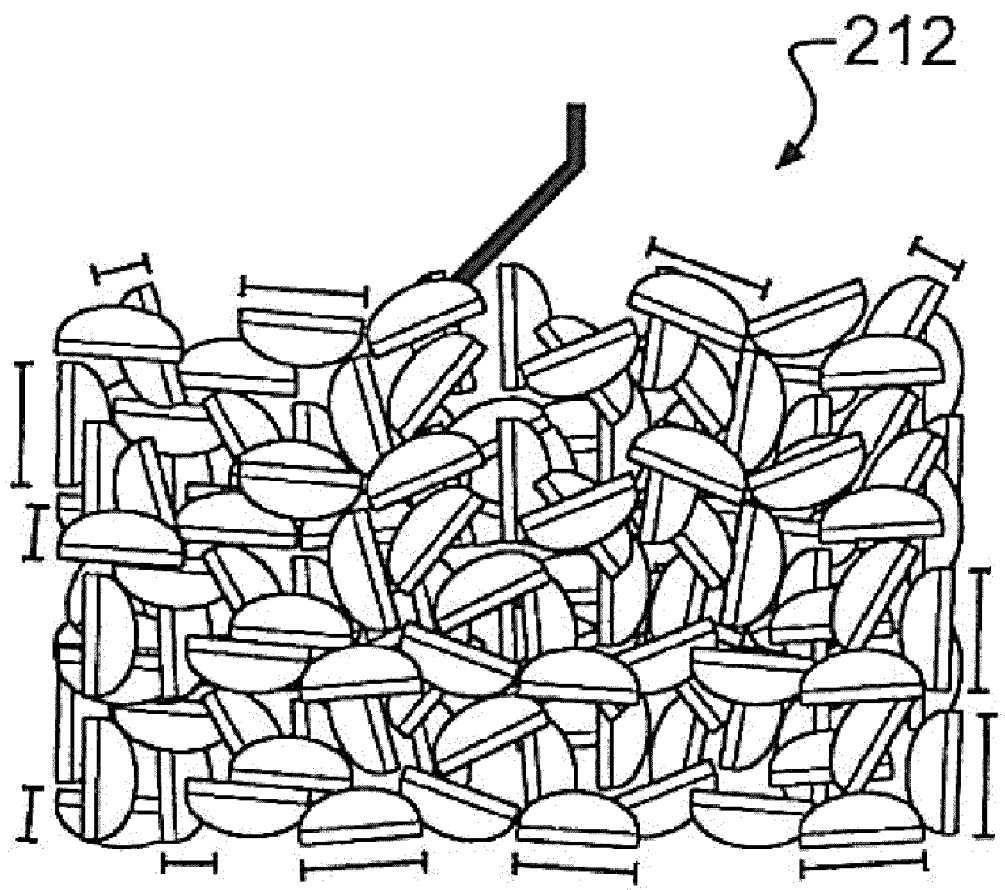
FIG. 10 illustrates the use of imaging tools of the present invention to identify and evaluate individual ice cube sizes.

In a preferred embodiment, digital image capture device 47 of the present invention may be utilized in a refrigerator 200 having an automatic ice dispensing system 202 including an ice dispensing bin 204 and a door-mounted dispenser 210 as depicted in FIG. 8. Automatic ice dispensing systems, such as that employed with the invention, are well known in the art and, therefore, basic details thereof need not be discussed herein. Instead, the manner in which ice making system 35 may be utilized to determine ice shrinking and clumping will now be described in detail. As previously discussed, digital image capture device 47 periodically captures and sends digital images to controller 43 and controller 43 passes the digital images to digital image analyzing system 50. As depicted in FIGS. 9A-9C, ice cubes 212 in ice dispensing bin 204 may shrink over time and develop clumps of ice such as indicated at 213 in FIG. 9C. Similarly, by comparing images, digital image analyzing system 50 will also detect ice shrinkage over time. That is, the digital images of ice cubes located on the outer edges of dispensing bin 204 (i.e., ice cubes in clear view of digital camera 64) are compared to determine differences in ice characteristics from image to image. For example, FIG. 10 depicts ice size characteristics for a single image taken by digital camera 64. If digital image analyzing system 50 detects that multiple ice cubes are smaller than a minimum expected cube size, then a signal will be sent to display 54 to indicate stale ice. In order to better determine ice quality and avoid false positive results, system 50 utilizes multiple image processing methods including edge detection interpolation and region of interest identification (ROI).

Figure 11A:
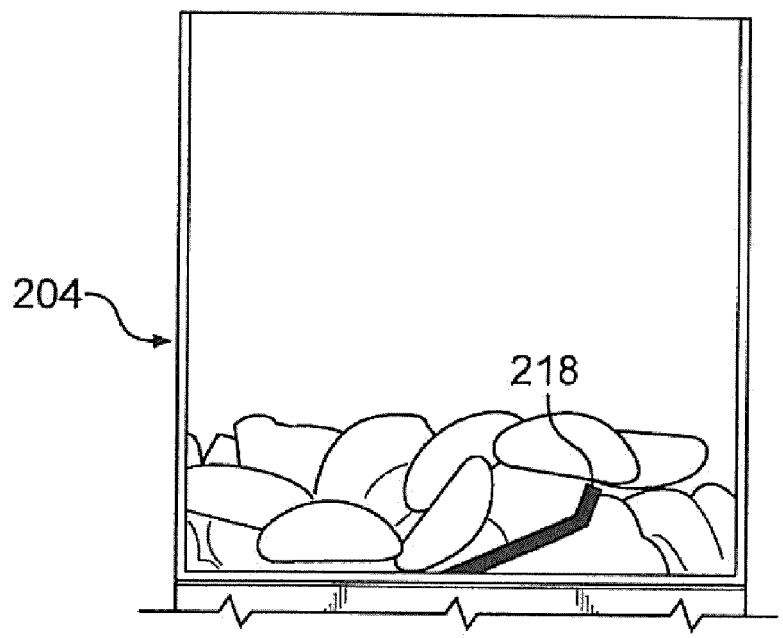
FIG. 11A depicts non-clumped ice within an ice bin.
Figure 11B:
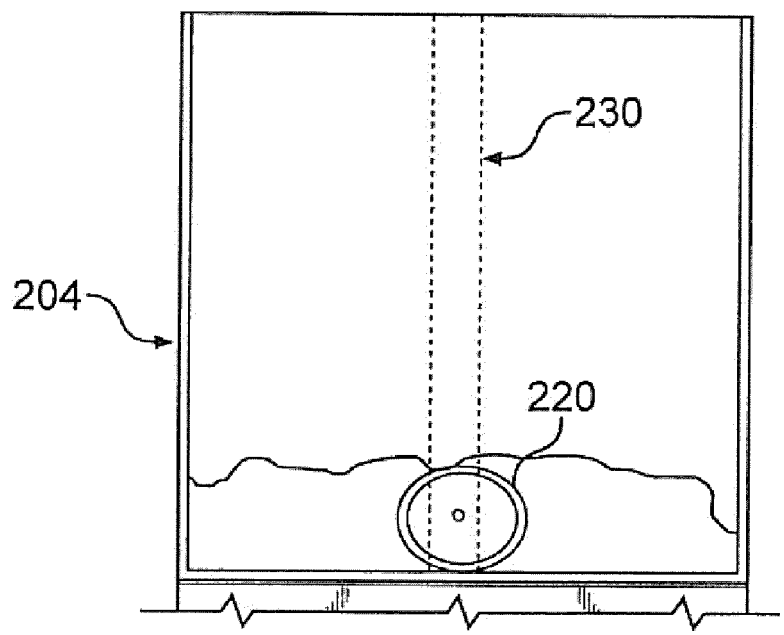
FIG. 11B depicts the non-clumped ice of FIG. 10A after image processing.
Figure 12A:
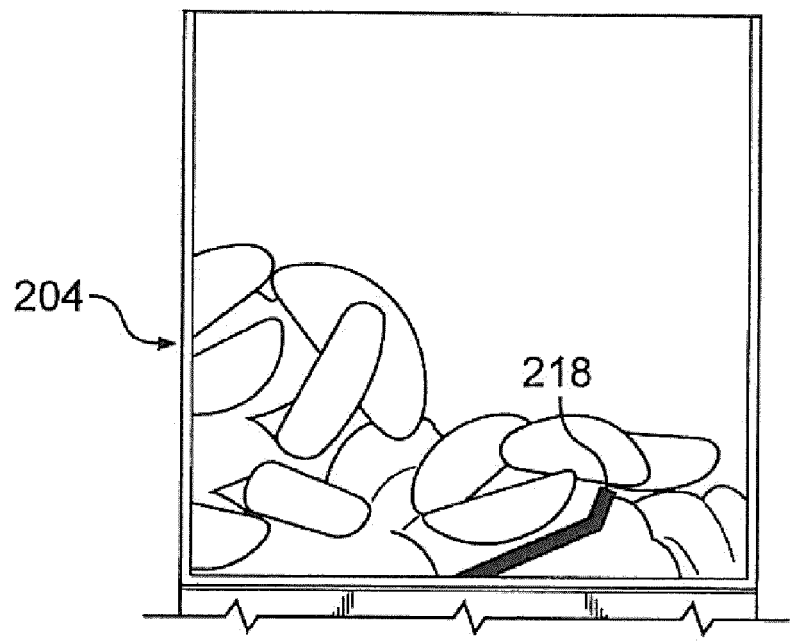
FIG. 12A depicts clumped ice within an ice bin.
Figure 12B:
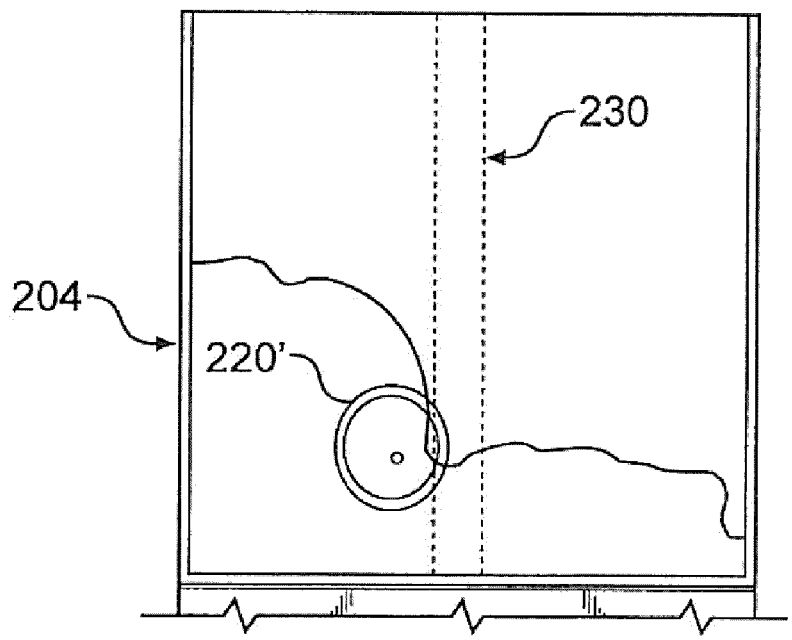
FIG. 12B depicts the clumped ice of FIG. 11A after image processing.

In addition, digital image analyzing system 50 monitors ice within ice dispensing bin 204 to detect ice clumping. In a manner known in the art, ice dispensing bin 204 includes an auger 218 (see, for example, FIG. 12A) which is positioned in the middle of bin 204 and rotates in order to aide in dispensing ice from bin 204 and preventing ice clumps from forming in bin 204. Therefore, when clumping of ice occurs, the clumps are usually located at the sides and corners of bin 204. For these reasons, monitoring a centroid or center of mass of a volume of ice allows for accurate detection of ice clumps. More specifically, a first image shown in FIG. 11A is sent to digital image analyzing system 50 where it is processed to determine a centroid 220 of the volume of ice within bin 204 as depicted in FIG. 11B. If system 50 determines that centroid 220 is within a pre-determined boundary indicated at 230, then no clumping event is detected. However, if clumping of ice has occurred, as depicted in FIGS. 12A and 12B, a centroid 220' of the volume of ice will fall outside of predetermined boundary 230 and system 50 will recognize an ice clumping event. Upon detection of an ice clumping event, a signal is sent to display 54 to alert a user.

Based on the above, it should be readily understood that the present invention enables a refrigerator to automatically control ice production to ensure that consumers have an adequate or desired amount of ice. In addition to ensuring an adequate supply of ice, the sensing system of the present invention enables the quality of the ice in the ice cube storage bin to be determined. Thus, consumers are provided the option of discarding ice that may be less than fresh. Although described with reference to preferred embodiments of the invention, it should be readily understood that various changes and/or modifications can be made to the invention without departing from the spirit thereof. For instance, it should be understood that the number and location of cameras can vary in accordance with the present invention. For example, cameras can be located above, behind, alongside or even below the ice cube storage bin to capture digital images. Also, it should be noted that the particular color of light employed by the light source can vary in accordance with the present invention to include white light, various colors of light, and, non-visible light in order to reveal different properties of the ice cubes. Furthermore, while shown in the main portion of the freezer compartment, the ice cube storage bin and, for that matter, the ice maker can be door mounted in the freezer compartment or, as indicated above, even provided in a dedicated freezer compartment located within the fresh food compartment of the refrigerator. Finally, the invention is not limited to dispensing model refrigerators but could be employed in models which make ice that needs to be manually removed from an ice cube storage bin. In general, the invention is only intended to be limited by the scope of the following claims.

What is claimed is:

1. A refrigerator comprising:
   a cabinet including top, bottom, rear and opposing side walls that collectively define a refrigerator body having a refrigeration compartment;
   a door for selectively providing access to the refrigeration compartment;
   an ice maker mounted in the refrigeration compartment;
   an ice cube storage bin for receiving ice cubes from the ice maker;
   a digital image capture device for capturing digital images, said digital image capture device being focused upon the ice cube storage bin; and
   a digital image analyzing system operatively connected to the digital image capture device, said digital image analyzing system being adapted to evaluate a centroid of the ice cubes through the digital images wherein, when the centroid is outside a predetermined acceptable boundary, the digital image analyzing system determines clumping of the ice cubes in the ice cube storage bin.

2. The refrigerator according to claim 1, wherein the digital images capture side views of ice cube storage bin so as to present an image profile of the ice cubes.

3. The refrigerator according to claim 2, wherein the digital image capture device is constituted by a camera selected from the group consisting of a CCD and CMOS camera.

4. The refrigerator according to claim 1, further comprising: a display provided on the cabinet wherein, upon detection of ice clumping, a signal is sent to the display to alert a user.

5. The refrigerator according to claim 1, further comprising:
   an ice cube dispenser located on the door and in communication with the ice cube storage bin; and
   an auger rotatably mounted in the ice cube storage bin for directing ice cubes from the ice cube storage bin to the ice cube dispenser, wherein the centroid is established along an axis of the rotatable auger extending within the ice cube storage bin.

6. The refrigerator according to claim 5, wherein the acceptable boundary is established as a vertical section of the ice cubes in the ice cube storage bin.

7. The refrigerator according to claim 1, wherein the digital image analyzing system further evaluates the digital images to determine a level of ice cubes within ice cube storage bin.

8. The refrigerator according to claim 7, further comprising: a light source, said light source being activated to bathe the ice cubes in light in order to enable a new digital image to be taken for further analysis by the digital image analyzing system.

9. The refrigerator according to claim 8, wherein the light source bathes the ice cube storage bin in colored light.

10. A method of analyzing ice cubes in an ice cube storage bin of a refrigerator comprising:
    focusing a digital image capture device, mounted in a refrigeration compartment of the refrigerator, on an ice cube storage bin;
    capturing a digital image of ice cubes in the ice cube storage bin;
    processing the digital image to determine a centroid of the ice cubes;
    determining whether the centroid is outside an acceptable boundary; and
    establishing that ice clumping exists in the ice cube storage bin if the centroid is outside the acceptable boundary.

11. The method of claim 10, further comprising: signaling that ice clumping exists to a user if the centroid is outside the acceptable boundary.

12. The method of claim 11, wherein the signaling that ice clumping exists includes displaying an alert on a user interface of the refrigerator.

13. The method of claim 10, wherein the acceptable boundary is predetermined and based on a position of a rotating auger within the ice cube storage bin.

14. The method of claim 10, further comprising: analyzing the digital image to determine a level of the ice cubes in the ice cube storage bin.

15. The method of claim 14, further comprising: if the level of the ice cubes is determined to be low, activating a light source which bathes the ice cubes in light, capturing a new digital image, and analyzing the new digital image with the digital image analyzing system to verify the low ice level.

16. The method of claim 15, further comprising: displaying an alert on a user interface of the refrigerator when the ice level is low.

17. The method of claim 15, further comprising: evaluating the digital image to detect a presence of stale ice in the ice cube storage bin.

18. The method of claim 17, wherein detecting the presence of stale ice constitutes determining a size of ice cubes within the ice cube storage bin and comparing the size with a predetermined minimum ice cube size.

19. The method of claim 18, further comprising: displaying a stale ice alert on a user interface when the size of the ice cubes is below the predetermined minimum ice cube size.

* * * * *